United States Patent [19]

Chess

[11] 4,182,779

[45] * Jan. 8, 1980

[54] EGG YOLK EXTENDER

[75] Inventor: William B. Chess, Monsey, N.Y.

[73] Assignee: Stauffer Chemical Company, Westport, Conn.

[*] Notice: The portion of the term of this patent subsequent to Feb. 7, 1995, has been disclaimed.

[21] Appl. No.: 857,053

[22] Filed: Dec. 5, 1977

[51] Int. Cl.² .................. A21D 13/08; A23L 1/32
[52] U.S. Cl. .................. 426/558; 426/614; 426/615; 426/622; 426/634; 426/657; 426/553
[58] Field of Search .................. 426/19, 21, 550, 555, 426/558, 602, 614, 615, 622, 634, 657

[56] References Cited

U.S. PATENT DOCUMENTS

| | | | |
|---|---|---|---|
| 1,750,720 | 3/1930 | Matti | 426/19 |
| 1,776,721 | 9/1930 | Bollman | 426/662 X |
| 3,271,164 | 9/1966 | Andt | 426/19 X |
| 3,348,951 | 10/1967 | Evans | 426/21 |
| 3,864,500 | 2/1975 | Lynn | 426/614 |

*Primary Examiner*—Robert A. Yoncoskie
*Attorney, Agent, or Firm*—Paul J. Juettner

[57] ABSTRACT

The present invention relates to a composition which can be used to extend egg yolks up to about a 75% replacement on a per weight basis of the yolk replaced depending on the area of use of the yolk without the need of modifying the final recipe by the user. The compositions can be liquid or dry and can be used to replace liquid or dry egg yolks respectively.

41 Claims, No Drawings

EGG YOLK EXTENDER

BACKGROUND OF THE INVENTION

1. Field of the Invention

The present invention relates to an egg yolk extender composition and egg yolk replacer as well as egg compositions prepared using the same.

2. Description of the Prior Art

Egg yolk extenders and replacers are well known in the art. They generally comprise various materials of grain or dairy origin in combination with various gums and emulsifiers. It is taught in U.S. Pat. No. 1,762,077, issued June 3, 1930 that lecithin emulsified with food fat can replace egg yolks. Egg yolks can be extended up to 50% by the use of equal parts of egg yolk and lecithin emulsified with twice the amount of water (1 part lecithin-2 parts water) as is disclosed in British Pat. No. 392,789, accepted May 25, 1933. Alien Property Custodian, 274,000 to Kramers, published May 4, 1943 discloses an egg substitute of casein, lecithin, fatty oils and optionally, a gum. However, it was found in Germany during World War II, that soybean lecithin cannot fully replace egg yolk in baked goods (Kirk-Othmer Encyclopedia of Chemical Technology, 2nd Edition, 1965, Vol. 12, page 356). In addition, most bakers prefer not to use lecithin as it is sticky and difficult to handle.

Egg yolks have also been extended for use in some areas by full fat soy flour. The main problem with the use of full fat soy flour is the inability of the baker to replace the egg yolk in his recipe on an equal weight basis without modification of the recipe. Full fat soy flour is unusable as a general egg yolk extender.

Generally, use of egg yolk extenders requires a modification of the recipe to obtain the required functional replacement of the egg yolk. The egg yolk extender should provide the emulsification and water binding characteristics of the egg yolk replaced. If the water binding characteristics are different from egg yolk, the baker's recipe will require modification in the amount of liquid added.

Since egg yolk provides various functions, one or more of which may be required in any specific recipe, the formulation of a general egg yolk extender requires consideration of all the areas in which egg yolk is useful and the functions which it performs in those areas. Most known egg yolk extenders do not provide the generality of use desirable. Thus, the use of some egg yolk extenders is limited. It would be commercially desirable to provide an egg yolk extender which can be used to replace egg yolk on an equal weight and functional basis without the need for modifying the recipe with regard to critical aspects such the water content.

These problems have been overcome with a formulated composition as disclosed in applicant's copending application Ser. No. 677,354, filed Apr. 15, 1976, now U.S. Pat. No. 4,072,764 which discloses an egg yolk extender composition comprising full fat soy flour, a grain flour, lecithin, humectant, a food grade emulsifier other than lecithin, a food grade gum and an appearance agent. It is taught that this composition can effectively extend egg yolks functionally on a 1:1 by weight replacement basis.

At the time of filing that application, full fat soy flour was an item of commerce, easily obtainable at a relatively low cost. Since that time, all local producers have either ceased manufacture or make it available at a cost which is prohibitive in preparing an egg yolk replacer which is more economical to use than natural egg yolks. The full fat soy flour is still available from Europe but the shipping charges make the cost prohibitive.

To fill the gap left by the removal of full fat soy flour, manufacturers are now selling a refatted soy flour. Soy oil and a small amount of lecithin which is also removed in the defatting process are blended with defatted soy flour to form the product. The final product has a lipid content of about 16% whereas the full fat soy flour has a lipid content of about 22%. Refatted soy flour cannot absorb the same quantity of oil contained in full fat soy flour. The use of the refatted soy flour as a replacement for the full fat soy flour in applicant's copending application does not provide as effective a product as the full fat soy flour product.

It has now been found that an egg yolk replacer can be prepared from defatted soy flour which provides the same beneficial qualities as a similar composition prepared using full fat soy flour.

THE INVENTION

In accordance with the present invention, it has been found that an improved egg yolk extender can be easily and inexpensively provided without using full fat soy flour by combining defatted soy flour having a protein dispersibility index of less than about 60, an edible food grade oil in a ratio to said defatted soy flour of from about 18:100 to about 40:100, grain flour in a ratio of grain flour to the combined weight of said defatted soy flour and said oil within the range of from about 1:10 to about 1:1, and lecithin in a ratio of lecithin to the combined weight of the defatted soy flour and the oil within the range of from about 1:100 to about 20:100. This composition can effectively extend egg yolks when used in an amount of up to about 75% and preferably up to about 50% egg yolk replacement depending on the area of use of the yolk.

The compositions of the present invention can be used as such in the dry state as an egg yolk extender for dried egg yolks. Also, the compositions of the present invention can be mixed with equal amounts by weight of water to form a liquid egg yolk extender. The invention is intended to cover compositions in both the dry and liquid state.

The composition of the present invention more nearly approximates the functional characteristics of egg yolk replaced when used on a per weight replacement basis. The composition of the present invention can be easily and inexpensively prepared.

All parts and ratios given herein are on a weight basis unless otherwise indicated.

DETAILED DESCRIPTION OF THE PRESENT INVENTION

Defatted soy flour is a common item of commerce. There are numerous methods of removing the oil from the soy bean to prepare this material including solvent extraction, continuous screw-pressing, and extruder-cooker operations. In general, the soy beans are steam-treated to crack the beans to allow the enzymes which are characteristic of the beany taste of the soy bean to be removed. After removal of the enzymes, the cracked beans are treated to remove the soy bean lipids, i.e., the oil and the lecithin. Defatted soy flours have been classified by their protein dispersibility index (PDI) using the American Oil Chemists' Society Test BA-1065. The protein dispersibility index should be less than 60 or a medium PDI. Preferably, the PDI is a low index within the range of from about 10 to about 45. An index of more than 60 is undesirable. An additional benefit of using defatted soy flour is the ability to treat the meal to reduce the beany flavor. In a particularly preferred embodiment, a bland (fully toasted) defatted soy flour such as Staley's Bland 50 can be used if desired.

The ratios of defatted soy flour and oil equivalent to full fat soy flour are critical in the present invention inasmuch as defatted soy flour alone cannot be used in place thereof. The use of defatted soy flour refatted with soy oil as a replacement for the full fat soy flour does not provide as effective a product as this combination does not approximate full fat soy flour. However, refatted soy flour can be used in the present invention if appropriate amounts of oil and lecithin are added to the final composition to provide amounts equivalent to full fat soy flour.

The defatted soy flour is blended with a grain flour in a ratio of grain flour to the combined weight of defatted soy flour and oil within the range of from about 1:10 to about 1:1. The flour can be from any commercial source as long as the flour is of fine particle size (less than about 150 mesh). The flour can be derived from any grain source such as corn, wheat, rye, oats, and the like and mixtures thereof. Preferably, the grain flour is derived from wheat. Short patent wheat flour is preferred.

If it is desired to cut the amount of flour used, a filler can be used for that purpose. Though the use of a filler is not preferred, one can use a material such as corn syrup solids as a filler. Up to 50% of the flour may be replaced with the filler without seriously harming the results achieved. The use of a filler is conditioned upon the limitation that the absorptive characteristics required of the product in the area of use are not seriously altered.

The oil used in the present invention can be any edible food grade oil such as corn oil, safflower oil, sesame oil, soy oil and salad oil (non-descript blend of excess oils sold under the condition that the oil is an edible food grade oil with no reference to source). It is preferred that the oil be soy oil though any food grade oil can be used as dictated by availability and price.

Lecithin is a well-known article of commerce. It basically comprises a group of phosphatides obtained from various materials such as soy bean, cotton seed, rape seed, castor seed, peanut and coffee as well as egg. While all the lecithins obtained from these sources can be used, the least expensive and most readily available lecithin, the lecithin of commerce, is soy bean lecithin. This is the preferred source of the lecithin used in the present invention.

Soy bean lecithin or commercial lecithin is available in many grades which include unbleached, single bleached and double bleached. Lecithin is also available in various fluid consistencies, it having been found that lecithin can be diluted with oils and fatty acids. The preferred lecithin is unbleached commercial lecithin.

The lecithin is used in an amount sufficient to provide a ratio of lecithin to the combined weight of the defatted soy flour and the oil within the range of from about 1:100 to about 20:100. Preferably, the ratio of lecithin to the combined weight of the defatted soy flour and the oil is within the range of from about 1:20 to about 3:20. Included within this amount is the amount needed to approximate the lecithin in full fat soy flour. The lecithin is preferably blended with the oil prior to blending the same with the flour. As an alternative, the lecithin can be heated to a temperature within the range of from about 40°–60° C. to increase its fluidity to facilitate its admixture with the other ingredients.

The amount of oil utilized is directly related to the amount of oil which would have been added if full fat soy flour was used. Full fat soy flour has approximately 22% lipids of which about 2% is phospholipids (lecithin). Sufficient oil is used to provide a total lipid content in the final egg yolk extender of from about 14% to about 24% and preferably from about 18% to about 20% and most preferably about 19% by weight based on the weight of the egg yolk extender.

For purposes of calculation, it will be assumed that 2% lecithin based on the weight of the egg yolk extender is included in the total quantity of lecithin used for the purpose of approximating the lecithin in the full fat soy flour.

While the blend of defatted soy flour, an oil, grain flour and lecithin can be used as such as an effective egg yolk extender, it has been found desirable to include additional ingredients with the aforementioned blend to expand the range of usefulness and provide a product more fully adapted to extend egg yolk on a per weight basis of the yolk replaced.

It has been found desirable to include a humectant in the blend. The humectant retains moisture in the final product and acts to inactivate or tie-up the moisture needed for bacteriological growth. Suitable humectants are any of the food grade polyols such as glycerine, sorbitol, mannitol, or propylene glycol. It is preferred to utilize glycerine. The humectant is used in an amount of from about 1 to about 12 parts per 100 parts of defatted soy flour and oil. More preferably, the humectant is used in an amount of from about 5 to about 10 parts per 100 parts of the defatted soy flour and oil.

It has also been found desirable to add from about 0.5 to about 3 and preferably from about 1 to about 3 parts per 100 parts of defatted soy flour and oil of a food grade gum. The gum adds to the viscosity of the batters and assists in retaining gases as they are formed in the baking process.

It has been found that for certain cake formulations, there is an optimum amount of gum at which the structural quality of the cake is maximized. The optimum amount depends on the ingredients in the formulation and is easily determined by one skilled in the art. The end result of using gum in the blend of the present invention is a better grain structure in the baked goods. Gums which can be used include alginates, such as sodium or potassium alginate, guar, xanthan, carrageenan, mixtures thereof and the like. The preferred gum is a carrageenan. Since the gums are natural products, each gum may not provide exactly equivalent results. Some variation may be required in the amount of gum utilized. The determination of this amount is well within the ability of one skilled in the art.

It has also been found desirable to include within the egg yolk extender composition of the present invention a food grade emulsifier other than lecithin. Such food grade emulsifiers are typically mono- and digylcerides, propylene glycol fatty acid esters, polyglycerol fatty acid esters, sorbitan monostearate, polyoxyethylene sorbitan fatty acids such as polyoxyethylene sorbitan monostearate, sodium stearoyl-2-lactylate, dioctyl sodium sulfosuccinate, and the like and mixtures thereof. The preferred emulsifiers include polyoxyethylene sorbitan monostearate and polyglycerol fatty acid esters. Mixtures of emulsifiers are also effective. Illustrative of such mixtures is the combination of propylene glycol fatty acid esters with mono and diglycerides. These emulsifiers serve the purpose of binding water and oil systems in the blend and add aeration qualities to the egg yolk extender. These emulsifiers in general are available in various forms such as liquid, viscous liquid, powder, flake, granule, bead, solid and paste though any particular one might not be available in all forms. The original lecithin alone is sufficient when used in those cases where aeration is not required. Preferably, it is desirable to use the combination of lecithin with the food grade emulsifiers to make the egg yolk extender a product of more general applicability. The food grade emulsifier can be used in the range of from about 1 part to about 12 parts per 100 parts of defatted soy flour and oil. A preferred range is from about 2 parts to about 4 parts per 100 parts of the defatted soy flour and oil.

While the previously listed emulsifiers are preferred, a wide range of food grade emulsifiers can be used such as those listed under "Emulsifiers: Whipping and Foaming Agents" on page 1013, of a book entitled: *FOODS, CHEMICALS CODEX*, 2nd Edition, published by the National Academy of Science, Washington, D.C. 1972 and the supplements thereto. That list of emulsifiers including those listed in the supplements is incorporated herein by reference.

In order to provide a properly colored egg yolk, it may be desirable to add an appearance agent in the form of a spice mix. These compositions are commercially available from spice houses and typically include wheat flour which acts as a carrier for other ingredients including spices; typically carotene, turmeric and annatto. The amount of spice mix utilized is dependent on the color desired.

If it is desired, the carotene, turmeric, and annatto can be blended alone with the egg yolk extender to provide the desired yellow color.

If it is desired to dilute the final egg yolk extender of the present invention, one can add corn syrup solids to the final blend. This is not preferred though it can be used effectively to reduce the overall cost. An amount of corn syrup solids within the range of from about 5 to about 15 parts corn syrup solids per 100 parts of the final product can be used.

The egg yolk extender of the present invention is generally prepared by mixing the defatted soy flour with the wheat flour followed by blending therewith a dispersion of the lecithin in the oil. As an alternative, the lecithin can be made fluid by heating. The lecithin/oil dispersion is added incrementally so that it can be fully absorbed into the flour as it is mixed. Mixing can be accomplished at ambient temperature. If desired, all of the additional emulsifiers can be added with the lecithin. If the emulsifier is a solid other than a finely divided material defined as less than about 60 mesh, or a viscous fluid, it can be liquefied in the heated lecithin and added to the blend at this point with the lecithin and oil.

A humectant, such as glycerine, is then preferably physically blended with the defatted soy flour grain flour and lecithin mixture.

If a liquid or finely powdered, less than about 60 mesh, emulsifier is used, it can be blended with the mixture at this point. A particularly effective emulsifier for this system is polyoxyethylene sorbitan monostearate which is a liquid and which can be added at this point.

The product can then be blended with some or all of the following ingredients: a gum such as carrageenan, and if desired, corn syrup solids, and coloring and flavoring ingredients (spice mix). If the product after thorough blending contains particles coarser than 60 mesh, at least those particles greater than 60 mesh and preferably the whole product is milled to provide a particle size of less than about 60 mesh. A high speed hammer mill such as a FITZMILL TM has been found to be effective for this purpose. Particles substantially coarser than 60 mesh will not provide the effective results desired. Screening or scalping to arrive at the desired particle size is not recommended since it has been found that the particles of the final blend are not of uniform composition. Removal of some particles may effect the overall composition of the final products. The product, which is in the form of dry stable agglomeration particles, can then be bagged for shipment.

The essentials of the process are thorough uniform mixing of all ingredients and a fine agglomerated particle size which can be achieved by milling.

The egg yolk extenders of the present invention can be utilized in any area where egg yolks are normally used such as yellow cake, sponge cake, Devil's Food Cake, doughnuts, pancakes, cookies, sweet doughs, salad dressings and sauces. The egg yolk extenders can be used in liquid or dry form as the recipe requires.

The product of the present invention can be sold as prepared or mixed with liquid or dried egg whole egg powder and albumen and if necessary water to provide a whole egg extender. The compositions can be liquid, dried or frozen as desired. These compositions provide the taste, texture, appearance and functional properties which closely match those of egg yolks in a wide range of applications.

In food products requiring egg yolks, the egg yolk extender of the present invention can be used to replace up to about 75% of the egg yolk depending on the area of use of the egg yolk. Some recipes, such as cookies, are not as sensitive as others to egg functionality. In those areas, replacement of egg yolk up to about 75% can be achieved. In areas more sensitive to the presence of egg yolk, replacement of about 45% to about 55% yolk is recommended. For general purpose use, it is recommended that only up to about 50% of the egg yolk be replaced.

Thus, the egg yolk requirement in a recipe can be satisfied with from about 25 to 99 parts egg yolk and 75 to 1 part of the composition of the invention. It is preferred that the amounts range from about 25 parts to about 75 parts egg yolk to from about 75 parts to about 25 parts egg yolk extender of the invention. It is preferred that the aforementioned amounts range from about 45 to about 55 parts egg yolk and from about 55 to about 45 parts composition of the present invention. The aforementioned ratio of material can be achieved by the baker during the preparation of a batter or a product comprising egg yolk and the egg yolk extender of the present invention which falls within the aforementioned limitations can be prepared and sold to the baker. The latter can be used to satisfy the egg yolk requirements of a recipe on a dry per weight basis. For purposes of this specification, this product of egg yolks and the egg yolk extender is referred to as an egg yolk replacer.

The egg yolk replacer can be liquid or dry. If a liquid egg yolk replacer is desired, liquid or liquefied egg yolks are mixed with dry egg yolk extender and water in a ratio of approximately 2:1:1.

Percentages and parts apply equally to liquid or dry egg yolk replacers.

The dry compositions of the present invention can also be used to replace egg yolk in dry whole eggs. An extended dry whole egg composition can be prepared using from about 60 to about 80 parts by weight egg yolk extender, and correspondingly, from about 40 to about 20 parts by weight albumen. The baker can use formulations of this type for direct replacement of dry eggs up to 75% and preferably from about 45% to 55% egg yolk replacement. If it is desired to prepare a composition which can be used directly to satisfy the dry whole egg replacement of a recipe, one can blend as little as 25 parts whole egg solids, as much as 52.5 parts egg yolk extender, the remaining 22.5 parts being albumen, all percentages being on a dry basis. A replacer for dry whole eggs comprising egg yolk, egg yolk extender and albumen would have a minimum of about 17.5 parts yolk and a maximum of about 52.5 parts egg yolk extender and about 30 parts albumen. An extended dry whole egg replacer can be thus prepared using from about 17.5 to about 52.5 parts by weight of the product of the invention and from about 52.5 to about 17.5 parts by weight egg yolk per 30 parts of albumen. Materials falling within these limits can be prepared by the baker in situ in the batter or prepared as a separate product which can be used by the baker as whole eggs in a recipe. The term "whole egg replacer", as used herein, is intended to cover a product of egg yolk, egg yolk extender and albumen prepared as a liquid and dried or dry, all parts being by weight.

The egg yolk extender can also be used in preparing a liquid whole egg extender. This composition would include about 20% dry yolk extender, about 20% water and about 60% albumen. This composition can be used by a baker or other use to replace up to 50% of the liquid whole egg requirement of his recipe.

The egg yolk extender can also be used in preparing a liquid whole egg replacer. A suggested formulation includes 50% liquid whole egg, 10% egg yolk extender, 10% water and 30% albumen. This product can also be made from liquid egg yolk using 20% liquid egg yolk, 10% egg yolk extender, 10% water and 60% albumen. These compositions can be used as such or frozen to facilitate shipment. These compositions can be used to replace up to 100% of the liquid whole eggs requirement of a recipe. These compositions can also be dried to form dry whole egg replacers. In this case, it is not necessary to add an amount of water equivalent to the egg yolk extender.

The following examples are included to aid in the understanding of the invention and variations may be made by one skilled in the art without departing from the spirit and the scope of the invention.

EXAMPLE 1

Preparation of Egg Yolk Extender

Into a ribbon blender was placed 119 kg (53%) defatted soy flour and 48.27 kg (21.5%) short patent wheat flour. 29.2 kg (13%) soy oil in which 13.47 kg (6%) lecithin had been dissolved was incrementally added while mixing. After the oil and lecithin mixture were thoroughly blended with the flour, 6.8 kg (3%) glycerine (U.S.P.) were slowly added with mixing. To this blend was added with mixing 4.5 kg (2%) polysorbate 60 which is a polyoxyethylene sorbitan monostearate sold under the tradename Tween 60. After the emulsifier was thoroughly blended, there was added with mixing 3.37 kg (1.5%) carrageenan (CARASTAY ® 26 from Stauffer Chemical Company, Westport, Connecticut). The product was then milled in a FITZMILL TM hammer mill and packaged in bags or drums. The total yield of product was 224.61 kg of dry product.

EXAMPLES 2, 3 and 4

Using the egg yolk extender prepared by the method of Example 1, yellow, sponge and Devil's Food Cakes were prepared according to the following formulations and procedures:

| YELLOW CAKE FORMULATION | | | | |
|---|---|---|---|---|
| Ingredients: | | Mixing Procedure: | | |
| Sugar | 345 gm | Mix dry ingredients; add emulsifier and shortineing. Add 180 cc water. Mix - scrape at each interval. | | |
| Cake Flour | 300 gm | | | |
| | | | Minutes | Speed |
| Salt | 6 gm | | | |
| | | | 1 | low |
| Baking Powder | 15 gm | | 1 | med. |
| | | | 2 | med. |
| NFDM Superheat | 24 gm | | | |
| Whole Dry Egg | 25 gm | | | |
| Egg Yolk Extender of Example 1 | 17.5 gm | Add 90 cc water | | |
| | | | 1 | low |
| | | | 1 | med. |
| | | | 2 | med. |
| Egg Albumen | 7.5 gm | | | |
| Creamtex* Cake Shortening | 108 gm | | | |
| Atmul** 80 Cake Emulsifier (mono - diglycerides) | 12 gm | | | |
| Water - 1st stage | 180 cc | Add 90 cc water | | |
| | | | 1 | low |
| 2nd stage | 90 cc | | 1 | low |
| 3rd stage | 90 cc | Scale 400 gm Specific gravity .85–.90 Bake at 350° F. for 32 min. | | |

*Reg. TM, SCM Corp.
**Reg. TM, ICI United States, Inc.

| SPONGE CAKE FORMULATION | | |
| --- | --- | --- |
| Ingredients: | | Mixing Procedure: |
| Cake Flour | 400 gm | Use Hobart Model C-100 with 3 qt. bowl and wire whip. |
| Sugar | 480 gm | Place all dry ingredients in bowl with emulsifier and water for 1st stage mix as follows scraping bowl seceral times. |
| NFDM Superheat | 30 gm | Add 280 cc ice water plus 2 cc vanilla. Mix - scrape at |
| Salt | 12 gm | each interval. |
| Baking Powder | 11 gm | Minutes / Speed |
| | | ½ / low |
| Atmos*2462 Emulsifier** | 20 gm | 1 / med. |
| | | 3 / high |
| Dried Egg Yolk | 24.5 gm | 3 / high |
| | | Add 200 cc water |
| Egg Yolk Extender (Example 1) | 24.5 gm | ½ / low |
| | | 2 / med. |
| Egg Albumen | 21 gm | 4 / low |
| | | 2 / med. |
| Water - 1st stage | 280 cc | |
| 2nd stage | 200 cc | If specific gravity of .510–.525 has not been obtained, mix an additional 30 sec. at 3rd speed. Scale 283 gms. into 6½" ungreased tube pans. Bake at 375° for 39 min. |

***Reg. TM, ICI United States, Inc.
****Atmos 2462 - a combination of hydrated mono and diglycerides, polysorbate 60 & sorbitan monostearate

| DEVILS FOOD CAKE | | |
| --- | --- | --- |
| Ingredients: | | Mixing Procedure: |
| Sugar | 304 gm | Mix dry ingredients; add emulsifier and shortening. |
| | | Add 160 cc ice water. Mix - scrape at each interval. |
| Cake Flour | 252 gm | |
| | | Minutes / Speed |
| NFDM Superheat | 21 gm | 1 / low |
| | | 1 / med. |
| Cocoa - Dutch Process | 35 gm | 1½ / med. |
| | | Add 100 cc water |
| Salt | 5 gm | 1 / low |
| | | 1 / med. |
| Baking Powder | 10 gm | 1½ / med. |
| | | Add 100 cc water |
| Bicarbonate of soda | 4 gm | 1 / low |
| | | 1 / low |
| Egg Yolk Solids | 14 gm | Scale 400 gm |
| | | Specific gravity .90–.93 |
| Egg Yolk Extender of Example 1 | 14 gm | Bake at 360° for 27 min. |
| Egg Albumen | 12 gm | |
| Creamtex cake shortening | 83 gm | |
| Atmos 2462 Emulsifier**** | 7 gm | |
| Water - 1st stage | 160 cc | |
| 2nd stage | 100 cc | |
| 3rd stage | 100 cc | |

Controls were prepared using the egg yolk extender as described in Example 1 of U.S. Ser. No. 677,354 in place of the egg yolk extender of the present invention. The test cakes using egg yolk extenders prepared according to the process of Example 1 of this invention were judged equivalent to the controls in flavor, strength, structure, color and overall appearance.

EXAMPLE 5

Using the egg yolk extender prepared by the method of Example 1, a salad dressing is prepared according to the following formulation:

| SALAD DRESSING FORMULATION | |
| --- | --- |
| | Percent |
| Soybean oil | 80.55 |
| Water | 6.66 |
| Cider Vinegar | 6.66 |
| Egg Yolk Solids | 1.74 |
| Egg Yolk Extender of Example 1 | 1.74 |
| Salt | 1.40 |

| SALAD DRESSING FORMULATION -continued | |
| --- | --- |
| | Percent |
| Sugar | 1.10 |
| Dry Mustard Powder | 1.15 |
| | 100.00 |

The water is placed in a mixer. The dry ingredients are added and mixed until just blended. A small portion of oil is added very slowly and then the vinegar is added with mixing. The remaining oil is then added very slowly with mixing.

A salad dressing characterized by acceptable body, flavor, and appearance is provided.

EXAMPLE 6

Pancakes were prepared in accordance with the present invention as follows:

| PANCAKE FORMULATION | | |
|---|---|---|
| INGREDIENTS | A | B |
| | % By Weight | |
| Wheat flour | 42.09 | " |
| Yellow corn flour | 25.25 | " |
| White rye flour | 12.63 | " |
| Rice flour | 4.21 | " |
| Dry milk | 2.10 | " |
| Corn sugar (Cerelose dextrose) | 2.10 | " |
| Bicarbonate of soda | 1.47 | " |
| Sodium aluminum phosphate | 1.47 | " |
| Salt | 1.68 | " |
| Product of Example 1 | 3.49 | 6.98 |
| Egg yolk | | |
| | 100.00 | 100.00 |

One cup (116 grams) of the dry blended pancake formulation was mixed with ¾ cup (6 oz. or 180 ml.) milk and one tablespoon (15 ml.) melted butter. The pancakes were cooked under normal conditions. Pancakes equivalent to those obtained using the yolk replacer of Ser. No. 677,354, now U.S. Pat. No. 4,072,764, at both 50% and 100% yolk replacement were obtained.

EXAMPLE 7

A Hollandaise Sauce was prepared in accordance with the present invention as follows:

| HOLLANDAISE SAUCE FORMULATION | |
|---|---|
| INGREDIENTS | |
| Butter (melted) | 56.15 |
| Dried egg yolk | 7.14 |
| Product of Example 1 | 7.14 |
| Water I (boiling) | 14.5 |
| Water II (boiling) | 12.66 |
| Vinegar or Lemon Juice | 4.41 |
| | 100.0 |

The Hollandaise Sauce was prepared by mixing the dried egg yolk product of Example 1, and the water I (boiling) in a double boiler under heat. The contents of the boiler were whipped with a wire wisk until thickened. The water II (boiling) the vinegar or lemon juice were then whipped in. After removing from the heat, the sauce was whipped well. While under heat, the melted butter was added and the sauce was heated until thick.

A Hollandaise Sauce equivalent to an all egg yolk control was obtained using either vinegar or lemon juice.

As used herein, all screen sizes are U.S. Standard Sieve Series (1940).

What is claimed is:

1. An egg yolk extender comprising defatted soy flour having a protein dispersibility index of less than about 60; an edible food grade oil in a ratio to said defatted soy flour of from about 18:100 to about 40:100, a grain flour in a ratio to the combined weight of said defatted soy flour and said oil within the range of from about 1:10 to about 1:1 and lecithin being present in a ratio to the combined weight of said defatted soy flour and said oil within the range of from about 1:100 to about 20:100, the oil and lecithin providing a total lipid content in the final egg yolk extender of from about 14% to about 24% by weight, and from about 0.5 parts to about 3 parts by weight per 100 parts of the combined weight of said defatted soy flour and said oil of a food grade gum selected from the group consisting of alginates, carrageenan, guar, xanthan and mixtures thereof, all ratios being on a weight basis.

2. The egg yolk extender as recited in claim 1 wherein said edible oil is selected from the group consisting of corn oil, safflower oil, sesame oil, soy oil and salad oil.

3. The egg yolk extender as recited in claim 1 wherein said edible oil and said lecithin are present in an amount sufficient to provide a total lipid content of from about 18% to about 20% based on the weight of the egg yolk extender.

4. The egg yolk extender as recited in claim 1 which further includes from about 1 part to about 12 parts by weight per 100 parts of the combined weight of said defatted soy flour and said oil of a humectant.

5. The egg yolk extender as recited in claim 4 wherein said humectant is a food grade polyhydric alcohol.

6. The egg yolk extender as recited in claim 5 wherein said polyhydric alcohol is glycerine.

7. The egg yolk extender as recited in claim 1 which further includes from about 1 part to about 12 parts by weight per 100 parts of the combined weight of said defatted soy flour and said oil of a food grade emulsifier other than lecithin.

8. The egg yolk extender as recited in claim 7 wherein said food grade emulsifier is selected from the group consisting of mono- and diglycerides, propylene glycol fatty acid esters, polyglycerol fatty acid esters, sorbitan monostearate, polyoxyethylene sorbitan fatty acid esters, sodium stearoyl-2-lactylate, dioctylsodium sulfosuccinate, polyoxyethylene sorbitan monostearate and mixtures thereof.

9. The egg yolk extender as recited in claim 8 wherein said food grade emulsifier is polyoxyethylene sorbitan monostearate.

10. The egg yolk extender as recited in claim 8 wherein said food grade emulsifier is propylene glycol fatty acid esters mixed with mono and diglycerides.

11. The egg yolk extender as recited in claim 8 wherein said food grade emulsifier is polyglycerol fatty acid esters.

12. The egg yolk extender as recited in claim 1 wherein said gum is carrageenan.

13. The egg yolk extender as recited in claim 4 which further includes from about 1 part to about 12 parts by weight per 100 parts of the combined weight of said defatted soy flour and said oil of a food grade emulsifier other than lecithin.

14. The egg yolk extender as recited in claim 13 wherein said edible oil is selected from the group consisting of corn oil, safflower oil, sesame oil, soy oil and salad oil.

15. The egg yolk extender as recited in claim 13 wherein said edible oil is present in an amount sufficient to provide a total lipid content of from about 18% to about 22% based on the combined weight of the defatted soy flour and the edible oil.

16. The egg yolk extender as recited in claim 13 wherein said gum is carrageenan.

17. A process for preparing an egg yolk extender comprising:
   A. blending lecithin with an oil,
   B. incrementally blending said lecithin/oil blend with a flour mixture of defatted soy flour having a protein dispersibility index of less than 60 and grain flour at a rate sufficient to allow said lecithin/oil blend to be absorbed into said flour mixture, and;

C. milling at least those particles of the product of Step B which are coarser than 60 mesh until particles of 60 mesh or finer are obtained, said oil being present in a ratio to said defatted soy flour of from about 18:100 to 40:100, said grain flour being present in a ratio to the combined weight of said defatted soy flour and said oil within the range of from about 1:10 to about 1:1, and said lecithin being present in a ratio to the combined weight of said defatted fat soy flour and said oil within the range of from about 1:100 to about 20:100, the oil and lecithin providing a total lipid content in the final egg yolk extender of from about 14% to about 24% by weight, all parts and ratios being on a weight basis.

18. The egg yolk extender as recited in claim 17 wherein said edible oil is selected from the group consisting of corn oil, safflower oil, sesame oil, soy oil and salad oil.

19. The egg yolk extender as recited in claim 17 wherein said edible oil and said lecithin are present in an amount sufficient to provide a total lipid content of from about 18% to about 20% based on the weight of the egg yolk extender.

20. The process as recited in claim 17 which further includes the step of admixing a humectant with the product of Step B in an amount of from about 1 part to about 12 parts by weight per 100 parts of the combined weight of said soy flour and said oil.

21. The process as recited in claim 17 wherein said grain flour is wheat flour.

22. The process as recited in claim 20 wherein said humectant is glycerin.

23. The process as recited in claim 17 which further includes admixing with the product of Step B a gum in the amount of from about 0.5 parts to about 3 parts per 100 parts of the combined weight of said defatted soy flour and said oil and from about 1 part to about 12 parts per 100 parts of the combined weight of said defatted soy flour and said oil of a liquid emulsifier other than lecithin or solid powdered food grade emulsifier, said solid emulsifier being of less than about 60 mesh, all parts being on a weight basis.

24. The process as recited in claim 23 wherein said gum is carrageenan.

25. The process as recited in claim 17 which further includes the step of admixing from about 1 part to about 12 parts by weight per 100 parts of the combined weight of said defatted soy flour and said oil of a food grade emulsifier other than lecithin with the product of Step B.

26. The process as recited in claim 25 wherein said emulsifier is a solid of less than 60 mesh.

27. The process as recited in claim 25 wherein the emulsifier is selected from the group consisting of mono- and diglycerides, propylene glycol fatty acid esters, polyglycerol fatty acid esters, sorbitan monostearate, polyoxyethylene sorbitan fatty acid esters, dioctyl sodium sulfosuccinate, sodium stearoyl-2-lactylate, polyoxyethylene sorbitan monostearate and mixtures thereof.

28. The process as recited in claim 23 which further includes the step of admixing a humectant with the product of step B in an amount of from about 1 to about 12 parts by weight per 100 parts of the combined weight of said defatted soy flour and said oil.

29. The process as recited in claim 28 wherein said humectant is glycerin.

30. A whole egg extender comprising from about 60 parts to about 80 parts of the product of claim 1 and from about 40 parts to about 20 parts albumen, all parts being on a weight basis of 100 parts.

31. A whole egg replacer composition comprising from about 17.5 parts to about 52.5 parts of the product of claim 1 and from about 52.5 parts to about 17.5 parts egg yolk to about 30 parts egg albumen, all parts being on a dry weight basis of 100 parts.

32. An egg yolk replacer comprising from about 25 parts to about 75 parts of the product of claim 1 and from about 75 parts to about 25 parts egg yolk, all parts being on a dry weight basis of 100 parts.

33. Egg yolk containing bakery goods comprising as a replacement for said yolk from about 25% to 75% on a dry weight replacement basis, the product of claim 1.

34. A liquid egg yolk extender comprising, in admixture, the product of claim 1 and an approximately equal weight of water.

35. A liquid egg yolk extender comprising, in admixture, the product of claim 13 and an approximately equal weight of water.

36. A liquid whole egg extender comprising in admixture, about 20% of the dry product of claim 1, about 20% water and about 60% albumen.

37. A liquid whole egg extender comprising in admixture about 20% of the product of claim 13, about 20% water and about 60% albumen.

38. A liquid whole egg replacer comprising, in admixture, about 20% liquid egg yolk, about 10% of the product of claim 1, about 10% water and about 60% albumen.

39. An egg yolk extender comprising defatted soy flour having a protein dispersibility index of less than about 60; an edible food grade oil in a ratio to said defatted soy flour of from about 18:100 to about 40:100, a grain flour in a ratio to the combined weight of said defatted soy flour and said oil within the range of from about 1:10 to about 1:1 and lecithin being present in a ratio to the combined weight of said defatted soy flour and said oil within the range of from about 1:100 to about 20:100, the oil and lecithin providing a total lipid content in the final egg yolk extender of from about 14% to about 24% by weight and from about 1 part to about 12 parts by weight per 100 parts of the combined weight of said defatted soy flour and said oil of a humectant, all ratios being on a weight basis.

40. The egg yolk extender as recited in claim 39 which further includes from about 1 part to about 12 parts by weight per 100 parts of the combined weight of said defatted soy flour and said oil of a food grade emulsifier other than lecithin.

41. The egg yolk extender as recited in claim 39 wherein said edible oil is selected from the group consisting of corn oil, safflower oil, sesame oil, soy oil and salad oil.

* * * * *